(12) United States Patent
Horigome et al.

(10) Patent No.: US 11,639,410 B2
(45) Date of Patent: May 2, 2023

(54) HEAT-CURABLE RESIN COMPOSITION AND USES THEREOF

(71) Applicant: Shin-Etsu Chemical Co., Ltd., Tokyo (JP)

(72) Inventors: Hiroki Horigome, Annaka (JP); Shoichi Osada, Annaka (JP); Yoshihiro Tsutsumi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 292 days.

(21) Appl. No.: 17/111,853

(22) Filed: Dec. 4, 2020

(65) Prior Publication Data

US 2021/0189043 A1  Jun. 24, 2021

(30) Foreign Application Priority Data

Dec. 18, 2019 (JP) .............................. JP2019-228187
Feb. 5, 2020 (JP) .............................. JP2020-018024

(51) Int. Cl.
| | |
|---|---|
| C08F 283/04 | (2006.01) |
| C09J 151/08 | (2006.01) |
| C08J 5/24 | (2006.01) |
| C08K 3/36 | (2006.01) |
| C08K 9/06 | (2006.01) |

(52) U.S. Cl.
CPC .............. *C08F 283/04* (2013.01); *C08J 5/244* (2021.05); *C08K 3/36* (2013.01); *C08K 9/06* (2013.01); *C09J 151/08* (2013.01); *C08J 2351/08* (2013.01)

(58) Field of Classification Search
CPC .......... C08F 283/04; C09J 151/08; C08J 5/24; C08K 3/36; C08K 9/06
USPC ...................................................... 523/207
See application file for complete search history.

(56) References Cited

U.S. PATENT DOCUMENTS

| | | |
|---|---|---|
| 2011/0120761 A1 | 5/2011 | Kawai |
| 2018/0009195 A1 | 1/2018 | Takeuchi et al. |

FOREIGN PATENT DOCUMENTS

| | | | | |
|---|---|---|---|---|
| EP | 3135722 A1 | * | 3/2017 | ............ C08G 59/42 |
| JP | 2011-132507 A | | 7/2011 | |
| JP | 2013-62446 A | | 4/2013 | |
| JP | 2015-101626 A | | 6/2015 | |
| JP | 2017-210527 A | | 11/2017 | |
| JP | 2020-506976 A | | 3/2020 | |
| WO | WO 2016/114287 A1 | | 7/2016 | |
| WO | WO 2018/111337 A1 | | 6/2018 | |

OTHER PUBLICATIONS

Office Action dated Dec. 13, 2022, in Japanese Patent Application No. 2019-228187.
Office Action dated Nov. 29, 2022 in Japanese Patent Application No. 2020-018024.

* cited by examiner

*Primary Examiner* — Deve V Hall
(74) *Attorney, Agent, or Firm* — Birch, Stewart, Kolasch & Birch, LLP

(57) ABSTRACT

Provided is a heat-curable resin composition capable of yielding a cured product that has a superior dielectric property and heat resistance and is thus useful for high-frequency purposes. Particularly, there are provided a composition containing the following components (A), (C) and (D); and a composition containing the following components (A) and (B). The components (A), (B), (C) and (D) are:

(A) a cyclopentadiene compound represented by the following formula (1) and/or an oligomer(s) of the cyclopentadiene compound

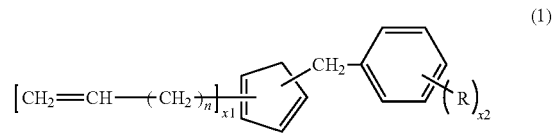

(1)

wherein R represents a group selected from an alkyl group, an alkenyl group and an aryl group, n represents an integer of 1 to 4, each of x1 and x2 independently represents 0, 1 or 2, provided that when R represents an alkyl group or an aryl group, x1 represents 1 or 2, and x1 and x2 satisfy $1 \leq x1+x2 \leq 4$;

(B) a cyclic imide compound;
(C) a curing accelerator; and
(D) an inorganic filler.

29 Claims, No Drawings

HEAT-CURABLE RESIN COMPOSITION AND USES THEREOF

BACKGROUND OF THE INVENTION

Field of the Invention

The present invention relates to a cyclopentadiene compound-containing heat-curable resin composition and uses thereof.

Background Art

In recent years, as electronic devices have become smaller and more sophisticated in terms of higher performance, it is now required that wirings be established in a finer and a more highly dense manner in multi-layered printed wiring boards. Further, since materials intended for high-frequency bands are required in the next generation, and reduction in transmission loss will be critical as a noise control measure, it is desired that an insulation material superior in dielectric properties be used in an insulation layer of a multi-layered printed wiring board.

As an insulation material for a multi-layered printed wiring board, epoxy resin compositions disclosed in JP-A-2011-132507, JP-A-2015-101626 and JP-A-2017-210527 are known.

In JP-A-2011-132507, it is disclosed that an epoxy resin composition containing an epoxy resin, an active ester compound and a triazine-containing cresol novolac resin is effective in lowering dielectric tangent. Further, in JP-A-2015-101626 and JP-A-2017-210527, it is disclosed that a resin composition containing an epoxy resin and an active ester compound as its essential components can be turned into a cured product with a low dielectric tangent, and is thus useful as an insulation material. However, it has now become clear that these epoxy resin compositions are not satisfactory in terms of high-frequency band applications.

Meanwhile, in WO2016/114287, it is reported that a resin film made of a resin composition containing a long-chain alkyl group-containing bismaleimide resin and a curing agent, as a non-epoxy material, is superior in dielectric properties (low relative permittivity and low dielectric tangent). However, the problem with such resin film is that since the long-chain alkyl group contained in the bismaleimide resin has a low heat resistance, the resin film itself has a low heat resistance as well.

SUMMARY OF THE INVENTION

It is an object of the present invention to provide a heat-curable resin composition capable of yielding a cured product having a high glass-transition temperature, being superior in dielectric properties, heat resistance and low water absorbability, and thus useful for high-frequency applications; and an electronic part, a heat-curable adhesive agent, an adhesive film, a prepreg and a multi-layered printed wiring board that are produced using the abovementioned heat-curable resin composition.

Further, another object of the present invention is to provide a heat-curable resin composition capable of yielding a cured product that has a superior dielectric property and heat resistance and is thus useful for high-frequency purposes; and a sealant for electronic part, a heat-curable adhesive agent, an adhesive film, a prepreg and a multi-layered printed-wiring board that are each produced using such heat-curable resin composition.

The inventors of the present invention diligently conducted a series of studies and completed the invention as follows. That is, the inventors found that the following heat-curable resin composition was capable of achieving the aforementioned objectives. Specifically, the present invention is to provide the following heat-curable resin composition; and a sealant for an electronic part, a heat-curable adhesive agent, an adhesive film, a prepreg and a multi-layered printed wiring board that are produced using such composition.

[1]

A heat-curable resin composition comprising:
(A) a cyclopentadiene compound represented by the following formula (1) and/or an oligomer(s) of the cyclopentadiene compound

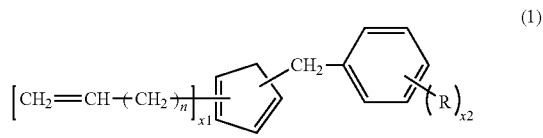

wherein R represents a group selected from an alkyl group having 1 to 6 carbon atoms, an alkenyl group having 2 to 6 carbon atoms and an aryl group having 6 to 10 carbon atoms, n represents an integer of 1 to 4, each of x1 and x2 independently represents 0, 1 or 2, provided that when R represents an alkyl group or an aryl group, x1 represents 1 or 2, and x1 and x2 satisfy 1≤x1+x2≤4;

(C) a curing accelerator; and
(D) an inorganic filler.

[2]

The heat-curable resin composition according to [1], wherein the oligomer(s) of the compound represented by the formula (1) as the component (A) includes a dimer(s) and/or trimer(s) of the compound represented by the formula (1).

[3]

The heat-curable resin composition according to [1] or [2], wherein the oligomer(s) of the compound represented by the formula (1) as the component (A) has a dicyclopentadiene ring.

[4]

The heat-curable resin composition according to any one of [1] to [3], wherein the oligomer(s) of the compound represented by the formula (1) is present in the component (A) at a ratio of 10 to 90% by mass.

[5]

The heat-curable resin composition according to any one of [1] to [4], wherein the component (D) is surface-treated with a silane coupling agent having an amino group, a methacryl group, a vinyl group or a styryl group.

[6]

The heat-curable resin composition according to any one of [1] to [5], further comprising:
(E) an adhesion aid having at least one epoxy group in one molecule.

[7]

A heat-curable resin composition comprising:
(A) a cyclopentadiene compound represented by the following formula (1) and/or an oligomer(s) of the cyclopentadiene compound

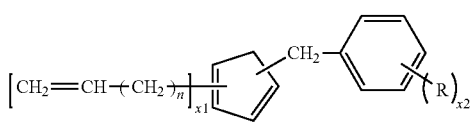
(1)

wherein R represents a group selected from an alkyl group having 1 to 6 carbon atoms, an alkenyl group having 2 to 6 carbon atoms and an aryl group having 6 to 10 carbon atoms, n represents an integer of 1 to 4, each of x1 and x2 independently represents 0, 1 or 2, provided that when R represents an alkyl group or an aryl group, x1 represents 1 or 2, and x1 and x2 satisfy $1 \leq x1+x2 \leq 4$; and (B) a cyclic imide compound having, in one molecule, at least one dimer acid backbone, at least one linear alkylene group having not less than six carbon atoms and at least two unsaturated cyclic imide groups, wherein the component (B) is in an amount of 5 to 95 parts by mass per a sum total of 100 parts by mass of the components (A) and (B).

[8]
The heat-curable resin composition according to [7], wherein the oligomer(s) of the compound represented by the formula (1) as the component (A) includes a dimer(s) and/or trimer(s) of the compound represented by the formula (1).

[9]
The heat-curable resin composition according to [7] or [8], wherein the oligomer(s) of the compound represented by the formula (1) as the component (A) has a dicyclopentadiene ring.

[10]
The heat-curable resin composition according to any one of [7] to [9], wherein the oligomer(s) of the compound represented by the formula (1) is present in the component (A) at a ratio of 10 to 90% by mass.

[11]
The heat-curable resin composition according to any one of [7] to [10], wherein the cyclic imide compound (B) is represented by the following formula (2):

[12]
The heat-curable resin composition according to [11], wherein the organic group represented by A in the formula (2) is a group expressed by any one of the following structural formulae:

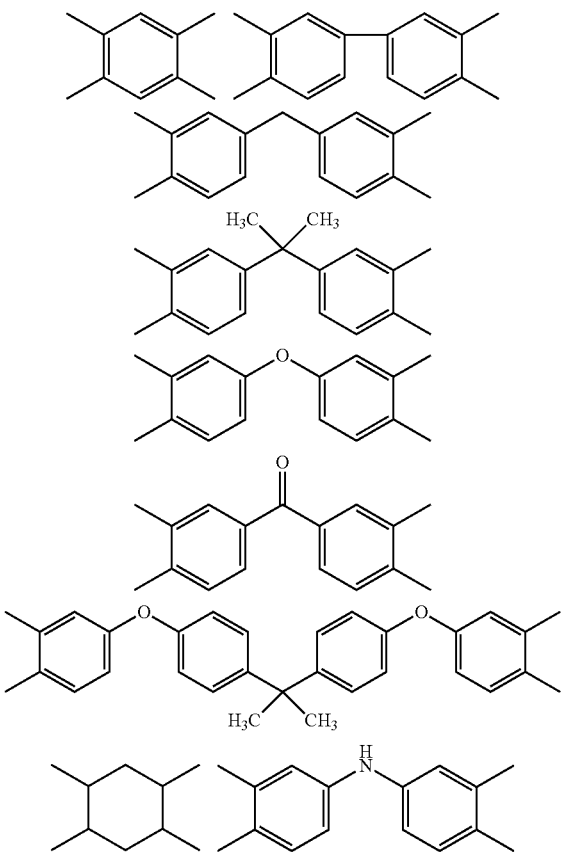

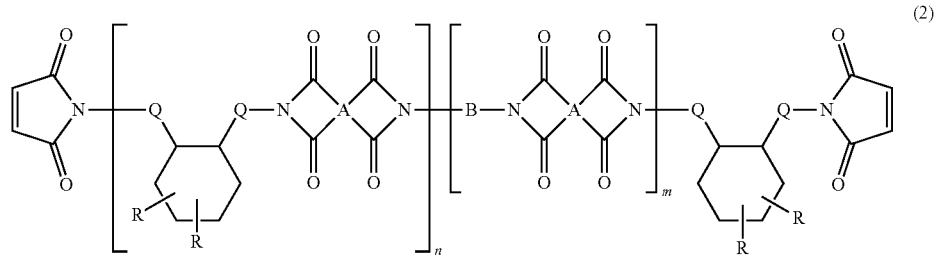
(2)

wherein A independently represents a tetravalent organic group having an aromatic ring or aliphatic ring; B represents an alkylene group that has 6 to 18 carbon atoms and a divalent aliphatic ring that may contain a hetero atom; Q independently represents a linear alkylene group having not less than 6 carbon atoms; R independently represents a linear or branched alkyl group having not less than 6 carbon atoms; n represents a number of 1 to 10; m represents a number of 0 to 10.

-continued

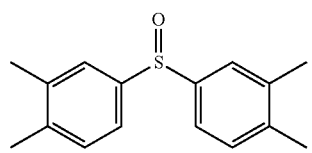

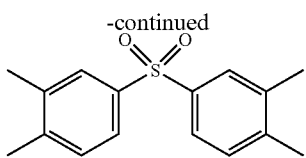

wherein bonds in the above structural formulae that are yet unbonded to substituent groups are to be bonded to carbonyl carbons forming cyclic imide structures in the formula (2).

[13]
The heat-curable resin composition according to any one of [7] to [12], further comprising:
(C) a curing accelerator.

[14]
The heat-curable resin composition according to any one of [7] to [13], further comprising:
(D) an inorganic filler.

[15]
The heat-curable resin composition according to [14], wherein the component (D) is surface-treated with a silane coupling agent having an amino group, a methacryl group, a vinyl group or a styryl group.

[16]
The heat-curable resin composition according to any one of [7] to [15], further comprising:
(E) an adhesion aid having at least one epoxy group in one molecule.

[17]
A sealant for an electronic part, comprising the heat-curable resin composition according to any one of [1] to [16].

[18]
The sealant according to [17], wherein the electronic part is a semiconductor device.

[19]
The sealant according to [17], wherein the electronic part is a coil part.

[20]
A heat-curable adhesive agent comprising the heat-curable resin composition according to any one of [1] to [16].

[21]
An adhesive film formed as a layer on a support film, comprising the heat-curable resin composition according to any one of [1] to [16].

[22]
A prepreg comprising a sheet-shaped fiber base material impregnated with the heat-curable resin composition according to any one of [1] to [16].

[23]
A multi-layered printed-wiring board having an insulation layer formed by a cured product of the heat-curable resin composition according to any one of [1] to [16].

Since the cured product of the heat-curable resin composition of the present invention has a high glass-transition temperature, and is superior in dielectric properties, heat resistance and low water absorbability, it is useful for high-frequency applications. Particularly, a sealant, a heat-curable adhesive agent, an adhesive film, a prepreg and a multi-layered printed wiring board that are produced using such heat-curable resin composition are useful for high-frequency applications.

Further, since the cured product of the heat-curable resin composition of the present invention is superior in dielectric property and heat resistance, it is useful for high-frequency purposes (e.g. electronic part, heat-curable adhesive agent, adhesive film, prepreg and multi-layered printed-wiring board). Furthermore, since such cured product is also superior in tracking resistance, it is also useful for power device purposes (e.g. inverter motor in hybrid vehicle and electric vehicle).

DETAILED DESCRIPTION OF THE INVENTION

The present invention is described in greater detail hereunder.

The composition of the present invention contains (A) a cyclopentadiene compound and/or an oligomer(s) thereof.

One embodiment of the composition of the present invention is a composition containing components (A), (C) and (D) (the composition of this embodiment may be referred to as composition 1 hereunder). In this embodiment, the composition may further contain a component (E) in addition to the components (A), (C) and (D).

Further, another embodiment of the composition of the present invention is a composition containing the component (A) and a component (B) (the composition of such embodiment may be referred to as composition 2 hereunder). In such embodiment, the composition may further contain the components (C), (D) and/or (E) in addition to the components (A) and (B).

Each component is described hereunder.

(A) Cyclopentadiene Compound and/or Oligomer Thereof

A component (A) contained in the heat-curable resin composition of the present invention is a cyclopentadiene compound represented by the following formula (1) and/or an oligomer(s) with the cyclopentadiene compound represented by the following formula (1)

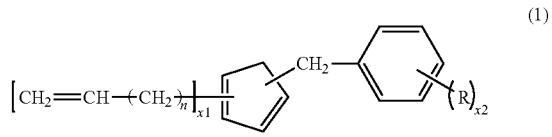

In the formula (1), R represents a group selected from an alkyl group having 1 to 6 carbon atoms, an alkenyl group having 2 to 6 carbon atoms and an aryl group having 6 to 10 carbon atoms; n represents an integer of 1 to 4; each of x1 and x2 independently represents 0, 1 or 2, provided that when R represents an alkyl group or an aryl group, x1 represents 1 or 2, and x1 and x2 satisfy $1 \leq x1+x2 \leq 4$.

In the above formula (1), n represents an integer of 1 to 4, preferably an integer of 1 to 2, particularly preferably 1. x1 represents 0, 1 or 2, preferably 0 or 1. x2 represents 0, 1 or 2, preferably 1 or 2.

Further, R represents a group selected from an alkyl group having 1 to 6 carbon atoms, an alkenyl group having 2 to 6 carbon atoms and an aryl group having 6 to 10 carbon atoms. Examples of an alkyl group include a methyl group, an ethyl group, a propyl group, an isopropyl group, an n-butyl group, an isobutyl group, a t-butyl group, an n-pentyl group, an isopentyl group, a neopentyl group, a t-pentyl group, an n-hexyl group, an isohexyl group, a cyclopentyl group and a cyclohexyl group.

Further, examples of an alkenyl group include a vinyl group, an allyl group, an isopropenyl group, a butenyl group, a pentenyl group and a hexenyl group.

Furthermore, examples of an aryl group include phenyl group, a tolyl group, a xylyl group, a mesityl group, a benzyl group, a biphenyl group and a naphthyl group.

Here, it is preferred that R represent an alkenyl group, particularly preferably a vinyl group or an allyl group.

When R represents an alkyl group or an aryl group, x1 is 1 or 2, preferably 1, and x1 and x2 satisfy $1 \leq x1+x2 \leq 4$, preferably $1 \leq x1+x2 \leq 2$.

Since the cyclopentadiene ring in the compound represented by the formula (1) is rich in reactivity, the compound represented by the formula (1), by Diels-Alder reaction, can be easily dimerized and/or trimerized so as to generate a dimer(s) and/or trimer(s). Here, such dimerization and trimerization reactions may be reactions involving cyclopentadiene compounds with an identical structure, or reactions involving cyclopentadiene compounds with different structures.

It is preferred that the component (A) contain an oligomer(s) of the compound represented by the formula (1) by an amount of 10 to 90% by mass, more preferably 15 to 85% by mass.

Further, it is preferred that the component (A) contain a dimer(s) of the compound represented by the formula (1) by an amount of 3 to 80% by mass, more preferably 5 to 70% by mass.

Here, the ratio of the dimer(s) of the compound represented by the formula (1) and the ratio of the oligomer(s) of the compound represented by the formula (1) are calculated based on peak area ratios measured by gel permeation chromatography (GPC).

In addition, it is preferred that an oligomer of the compound represented by the formula (1) have a dicyclopentadiene ring structure.

Further, a reaction for forming a dicyclopentadiene ring by reaction of the cyclopentadiene ring in the compound represented by the formula (1) i.e. a Diels-Alder reaction between the cyclopentadiene rings in two molecules of the compound represented by the formula (1), is more likely to take place than a reaction between a cyclopentadiene ring and other carbon-carbon double bonds that are capable of being subjected to Diels-Alder reaction. Therefore, it is considered that the compound having such dicyclopentadiene ring is contained in the component (A) by a large amount.

Moreover, since the compound represented by the formula (1) has reactive double bonds other than the cyclopentadiene ring, oligomers can be generated by a reaction between these reactive double bonds and/or by a reaction between these reactive double bonds and the cyclopentadiene ring.

The oligomers may, for example, have the structures represented by the following formulae.

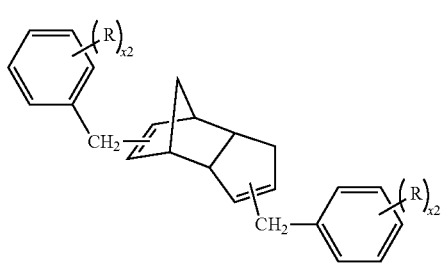

(1-1)

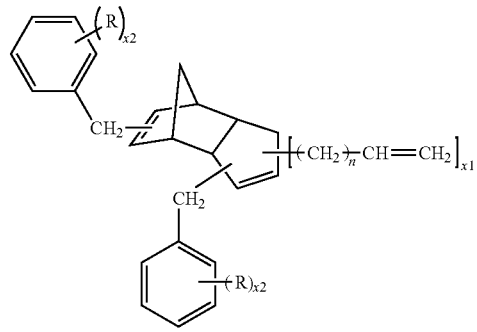

(1-2)

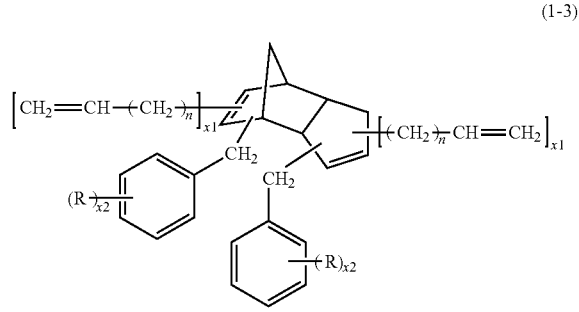

(1-3)

In formulae (1-1) to (1-3), R, n, x1 and x2 are defined as above.

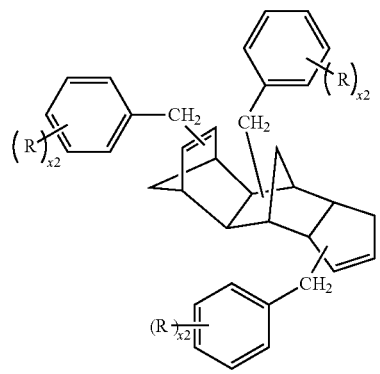

(1-4)

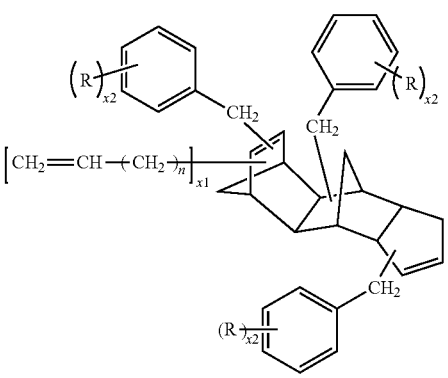

(1-5)

-continued (1-6)

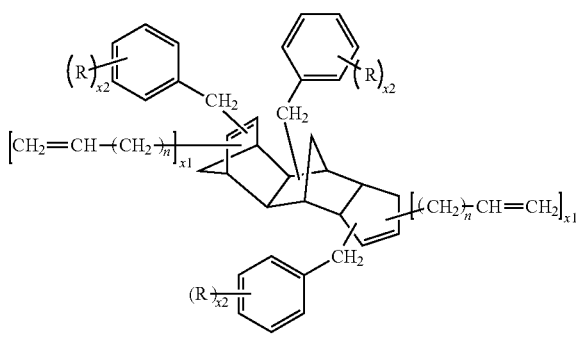

In formulae (1-4) to (1-6), R, n, x1 and x2 are defined as above.

(1-7)

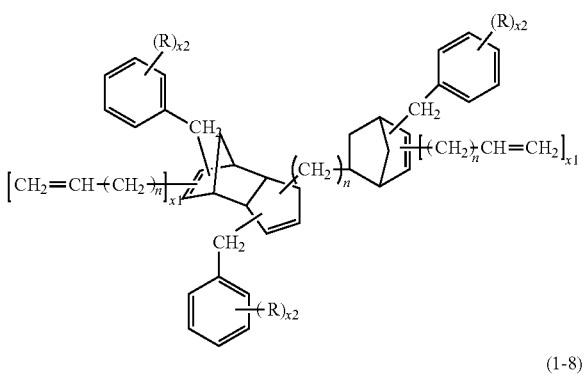

(1-8)

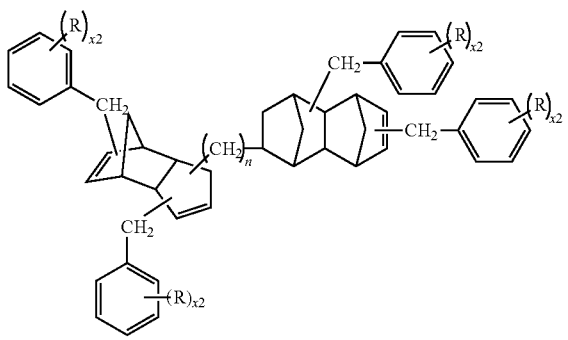

In formulae (1-7) and (1-8), R, n, x1 and x2 are defined as above.

The oligomers can be obtained by heating the compound represented by the formula (1) at 50 to 200° C., preferably 60 to 180° C., more preferably 70 to 160° C., for 20 to 180 min, preferably 40 to 150 min, more preferably 60 to 120 min. It is preferred that this reaction be performed under vacuum.

Further, the compound represented by the formula (1) may be heated either with or without the aid of a solvent; if necessary, the heating of the compound may be performed in a high-boiling-point solvent such as toluene, xylene or anisole.

In order for the component (A) to have not less than 3% by mass of a dimer(s) of the cyclopentadiene compound represented by the formula (1), it is preferred that the compound represented by the formula (1) be heated at 70 to 160° C. for 1 to 2 hours under vacuum.

There are no particular restrictions on a weight-average molecular weight (Mw) of the cyclopentadiene compound as the component (A) as well as the properties of the compound at room temperature (25° C.). However, it is preferred that a weight-average molecular weight of the compound in terms of polystyrene when measured by gel permeation chromatography (GPC) be not larger than 10,000, particularly preferably 100 to 5,000. When such molecular weight is not larger than 10,000, there exists no concern that a fluidity may deteriorate due to an excessively high viscosity of the composition obtained, and a favorable moldability in, for example, laminate molding will be exhibited. Further, when such molecular weight is not larger than 10,000, the cyclopentadiene compound as the component (A) shall exhibit a favorable compatibility with a cyclic imide compound if the composition contains a later-described component (B).

Here, the weight-average molecular weight (Mw) referred to in this specification is a weight-average molecular weight measured by GPC under the following conditions, using polystyrene as a standard substance.

Measurement Condition

Developing solvent: Tetrahydrofuran

Flow rate: 0.35 mL/min

Detector: RI

Column: TSK-GEL Super HZ type (Tosoh Corporation)

Super HZ4000 (4.6 mm I. D.×15 cm×1)

Super HZ3000 (4.6 mm I. D.×15 cm×1)

Super HZ2000 (4.6 mm I. D.×15 cm×1)

Column temperature: 40° C.

Sample injection volume: 5 μL (THF solution of a concentration of 0.1% by weight)

As for the component (A) which is the cyclopentadiene compound and/or an oligomer(s) thereof, one kind of such component (A) may be used alone, or two or more kinds thereof may be used in combination.

(B) Cyclic Imide Compound

A component (B) used in the present invention is a cyclic imide compound having, in one molecule, at least one dimer acid backbone, at least one linear alkylene group having not less than six carbon atoms and at least two unsaturated cyclic imide groups. The component (B) serves to impart properties such as a low dielectric property, a tracking resistance and a low elasticity to the composition of the present invention. By allowing the cyclic imide compound as the component (B) to possess a linear alkylene group(s) having not less than six carbon atoms, not only a cured product of the composition containing the cyclic imide compound will exhibit a superior dielectric property, but a content ratio of phenyl groups will decrease, and the tracking resistance will improve. Further, by allowing the cyclic imide compound as the component (B) to possess a linear alkylene group(s), the cured product of the composition containing the cyclic imide compound will exhibit a lower elasticity, which is also effective in reducing a stress applied to a semiconductor device by the cured product.

Particularly, it is preferred that the cyclic imide compound as the component (B) be a maleimide compound, more preferably a maleimide compound represented by the following formula (2).

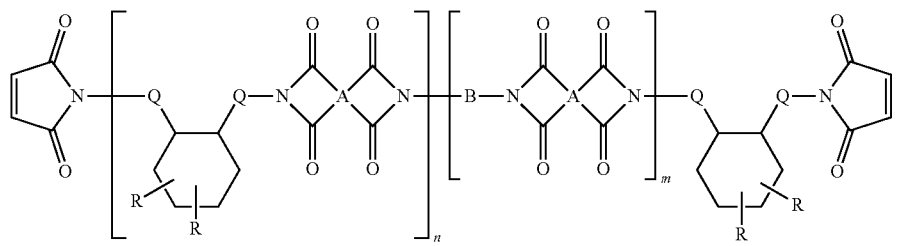

(2)

In the formula (2), A independently represents a tetravalent organic group having an aromatic ring or aliphatic ring. B represents an alkylene group that has 6 to 18 carbon atoms and a divalent aliphatic ring that may contain a hetero atom. Q independently represents a linear alkylene group having not less than 6 carbon atoms. R independently represents a linear or branched alkyl group having not less than 6 carbon atoms. n represents a number of 1 to 10. m represents a number of 0 to 10.

While Q in the formula (2) represents a linear alkylene group having not less than 6 carbon atoms, it is preferred that such linear alkylene group have 6 to 20, more preferably 7 to 15 carbon atoms.

Further, R in the formula (2) represents an alkyl group which may be either a linear alkyl group or a branched alkyl group, and such alkyl group has not less than 6 carbon atoms. However, it is preferred that this alkyl group have 6 to 12 carbon atoms.

A in the formula (2) represents a tetravalent organic group having an aromatic ring or aliphatic ring, and is preferably any one of the tetravalent organic groups represented by the following structural formulae:

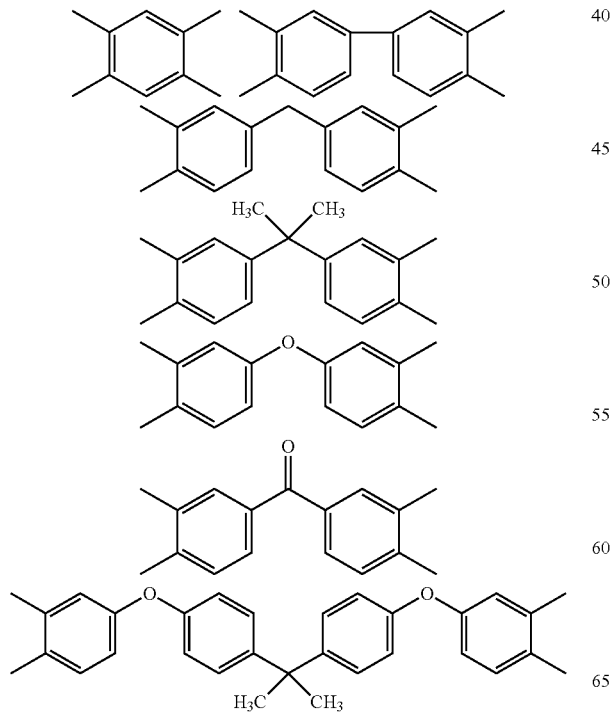

-continued

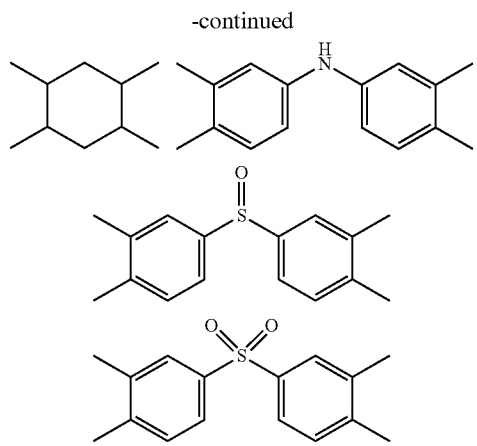

Bonds in the above structural formulae that are yet unbonded to substituent groups are to be bonded to carbonyl carbons forming cyclic imide structures in the formula (2).

Further, B in the formula (2) represents an alkylene group that has 6 to 18 carbon atoms and a divalent aliphatic ring that may contain a hetero atom, and it is preferred that such alkylene group have 8 to 15 carbon atoms. It is preferred that B in the formula (2) be any one of the aliphatic ring-containing alkylene groups represented by the following structural formulae:

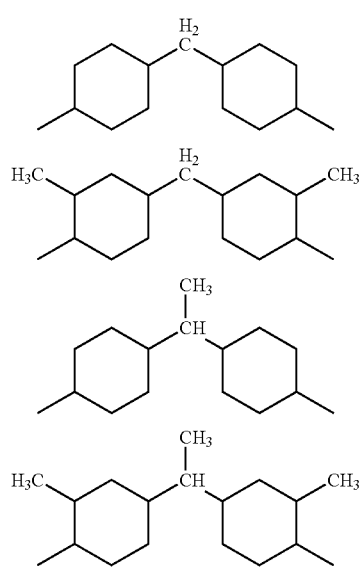

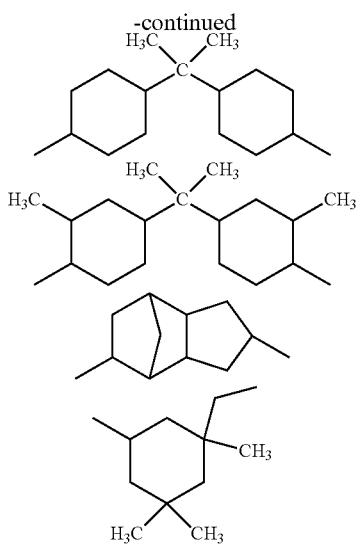

Bonds in the above structural formulae that are yet unbonded to substituent groups are to be bonded to nitrogen atoms forming cyclic imide structures in the formula (2).

n in the formula (2) represents a number of 1 to 10, preferably a number of 2 to 7. m in the formula (2) represents a number of 0 to 10, preferably a number of 0 to 7.

While there are no particular restrictions on the weight-average molecular weight (Mw) of the cyclic imide compound as the component (B) and a state thereof at room temperature (25° C.), it is preferred that a weight-average molecular weight measured by gel permeation chromatography (GPC) be not larger than 70,000, particularly preferably 500 to 50,000, in terms of polystyrene. When such molecular weight is not larger than 70,000, not only a favorable moldability such as a lamination formability will be exhibited as there exists no concern that a fluidity may deteriorate due to an excessively high viscosity of the composition obtained, but a favorable compatibility with the component (A) will be exhibited.

As the cyclic imide compound as the component (B), there may be used commercially available products such as BMI-1500, BMI-3000 and BMI-5000 (all by Designer Molecules Inc.). Further, there may also be used, for example, a cyclic imide compound obtained by reacting a dimer acid backbone-containing carboxylic acid anhydride with a diamine possessing a linear alkylene group(s) having not less than six carbon atoms. One kind of cyclic imide compound may be used alone, or two or more kinds thereof may be used in combination.

(C) Curing Accelerator

A curing accelerator used in the present invention is to promote a reaction between the components (A) alone or reactions between the component (A) and other components (e.g. component (B)). In general, a radical reaction initiator is often used to promote the reaction of reactive double bonds. Examples of a radical reaction initiator include radical initiators such as photo-radical initiators and thermal radical initiators. A preferable radical reaction initiator is a thermal radical initiator. A more preferable thermal radical initiator is an organic peroxide. As an organic peroxide, even more preferred is an organic peroxide having a 10 hour half-life temperature of 100 to 170° C. Specific examples of the curing accelerator as the component (C) include dicumyl peroxide, 2,5-dimethyl-2,5-di(tert-butylperoxy)hexane, tert-butylcumylperoxide, di-tert-butylperoxide, 1,1,3,3-tetramethylbutyl hydroperoxide and cumene hydroperoxide.

Regardless of the type thereof, any one of these curing accelerators may be used alone, or two or more of them may be used in combination.

(D) Inorganic Filler

An inorganic filler as a component (D) is added to reduce a thermal expansion rate of a cured product of the heat-curable resin composition of the present invention, and improve the mechanical properties of such cured product. Examples of an inorganic filler include silicas such as a spherical silica, a molten silica, a crystalline silica and cristobalite; alumina; silicon nitride; aluminum nitride; boron nitride; titanium oxide; glass fibers; and magnesium oxide. There may also be listed a fluorine resin-containing filler or a fluorine resin-coated filler for the purpose of improving dielectric properties. The average particle sizes and shapes of these inorganic fillers may be selected in accordance with the intended use of the composition of the invention.

As an inorganic filler, there may be used those that have already been surface-treated with a coupling agent such as a silane coupling agent and a titanate coupling agent, for the purpose of improving a bond strength between the resin component(s) and the inorganic filler. Such coupling agent may be an epoxy group-, amino group-, mercapto group-, vinyl group-, styryl group- or methacryl group-containing silane coupling agent, specific examples of which may include epoxysilanes such as 3-glycidoxypropyltrimethoxysilane, 3-glycidoxypropylmethyldiethoxysilane and 2-(3,4-epoxycyclohexyl)ethyltrimethoxysilane; aminosilanes such as N-2(aminoethyl)-3-aminopropyltrimethoxysilane, a reactant of imidazole and 3-glycidoxypropyltrimethoxysilane, 3-aminopropyltrimethoxysilane and N-phenyl aminopropyltrimethoxysilane; mercaptosilanes such as 3-mercaptosilane and 3-episulfidoxy propyltrimethoxysilane; vinylsilanes such as vinyltrimethoxysilane and vinyltriethoxysilane; styryl silanes such as p-styryltrimethoxysilane; and methacryl silanes such as 3-methacryloxypropylmethyldimethoxysilane, 3-methacryloxypropyltrimethoxysilane, 3-methacryloxypropylmethyldiethoxysilane and 3-methacryloxypropyltriethoxysilane. An amino group-, methacryl group-, vinyl group- or styryl group-containing silane coupling agent is preferred in terms of improving strength. Here, there are no particular restrictions on the amount of the coupling agent used for surface treatment as well as a surface treatment method.

(E) Adhesion Aid Having at Least One Epoxy Group in One Molecule

An adhesion aid (E) having at least one epoxy group in one molecule may be added to the heat-curable resin composition of the present invention if necessary. The epoxy group-containing adhesion aid as the component (E) is used to improve an adhesion strength between the heat-curable resin composition of the invention and Si, Cu, Ni or the like. While there are no particular restrictions on the component (E) as long as it has at least one epoxy group in one molecule thereof, specific examples of the component (E) include an isocyanurate-type epoxy resin such as triglycidyl isocyanurate; an aromatic amine-type epoxy resin such as triglycidyl p-aminophenol; a bisphenol A-type epoxy resin such as bisphenol-A-diglycidylether; a dicyclopentadiene-type epoxy resin such as dicyclopentadiene-phenol addition type glycidyl ether; and an epoxy group-containing silane coupling agent such as 3-glycidoxypropyltrimethoxysilane and 2-(3,4-epoxycyclohexyl)ethyltrimethoxysilane. Regardless of the type thereof, any one of these adhesion aids each having at least one epoxy group in one molecule may be used alone, or two or more of them may be used in combination.

If adding the component (E), there may also be added a component (C') which is a curing accelerator for promoting the reaction of epoxy groups, other than the curing accelerator (C). There are no particular restrictions on the curing accelerator (C') as long as it is capable of promoting the curing reaction of a general epoxy resin composition. For example, there may be listed an amine compound such as 1,8-diazabicyclo[5.4.0]-7-undecene; an organic phosphorous compound such as triphenylphosphine and tetraphenylphosphonium-tetraborate salt; and an imidazole compound such as 2-methylimidazole.

Regardless of the type thereof, any one of these curing accelerators (C') may be used alone, or two or more of them may be used in combination.

Other Additives

If necessary, various additives may be further added to the heat-curable resin composition of the present invention. The following additives may, for example, be added to the composition of the invention, provided that the effects of the invention will not be impaired thereby. For example, in order to improve resin properties, there may be added, for example, other heat-curable resins such as an organopolysiloxane, a silicone oil, an epoxy resin other than the component (E) and a cyanate resin; a thermoplastic resin; a thermoplastic elastomer; an organic synthetic rubber; a light stabilizer; a polymerization inhibitor; a colorant; and a dye. Further, in order to improve a wettability to a filler and an adhesion to a base material, a coupling agent may be added. Furthermore, in order to improve electric properties, an ion trapping agent may be added. Moreover, in order to impart a flame retardancy, there may be added a non-halogen flame retardant such as a phosphorous compound and a metal hydrate, each serving as a typical example of a non-halogen flame retardant. In addition, in order to improve dielectric properties, there may also be added a fluorine-containing material such as a PTFE powder.

As for the composition 1 containing the components (A), (C) and (D), the amount(s) of each component are as follows.

It is preferred that the curing accelerator (C) in the composition 1 be added in an amount of 0.1 to 5 parts by mass, more preferably 0.3 to 4 parts by mass, even more preferably 0.5 to 3 parts by mass, per 100 parts by mass of the component (A). When the amount of the curing accelerator added is not smaller than 0.1 parts by mass, curing reaction will proceed in a sufficient manner; when the amount of the curing accelerator added is not larger than 5 parts by mass, the heat-curable resin composition will exhibit a favorable storage stability.

It is preferred that the inorganic filler (D) in the composition 1 be added in an amount of 10 to 2,000 parts by mass, more preferably 20 to 1,200 parts by mass, even more preferably 40 to 1,000 parts by mass, per 100 parts by mass of the component (A). Further, it is preferred that the inorganic filler be contained in the composition 1 by an amount of 30 to 95% by mass, more preferably 40 to 90% by mass, even more preferably 50 to 85% by mass, provided that the whole composition is of an amount of 100% by mass. By allowing the composition to contain a given amount of an inorganic filler, the composition 1 can, for example, be molded into a sheet-like shape for use in a substrate or used as a sealing material.

When the composition 1 contains the adhesion aid (E) having at least one epoxy group in one molecule, the adhesion aid is added in an amount of 0.1 to 20 parts by mass, preferably 0.3 to 15 parts by mass, more preferably 0.5 to 10 parts by mass, per 100 parts by mass of the component (A).

Further, in the case where the component (E) is added to the composition 1, and where the composition 1 further contains the curing accelerator (C') for promoting the reaction of epoxy groups, other than the curing accelerator (C), the curing accelerator (C') is preferably added in an amount of 0.1 to 5 parts by mass, more preferably 0.3 to 4 parts by mass, even more preferably 0.5 to 3 parts by mass, per a sum total of 100 parts by mass of the components (A) and (E). When the amount of the curing accelerator (C') added is not smaller than 0.1 parts by mass, curing reaction will proceed in a sufficient manner; when the amount of the curing accelerator (C') added is not larger than 5 parts by mass, the heat-curable resin composition will exhibit a favorable storage stability.

As for the composition 2 containing the components (A) and (B), the amount(s) of each component are as follows.

It is preferred that the cyclic imide compound (B) in the composition 2 be added in an amount of 5 to 95% by mass, more preferably 20 to 80% by mass, even more preferably 30 to 70% by mass, per a sum total of the components (A) and (B).

If the composition 2 contains the curing accelerator (C), it is preferred that the curing accelerator be added in an amount of 0.1 to 5 parts by mass, more preferably 0.3 to 4 parts by mass, even more preferably 0.5 to 3 parts by mass, per a sum total of 100 parts by mass of the components (A) and (B). When the amount of the curing accelerator added is not smaller than 0.1 parts by mass, curing reaction will proceed in a sufficient manner; when the amount of the curing accelerator added is not larger than 5 parts by mass, the heat-curable resin composition will exhibit a favorable storage stability.

If the composition 2 contains the inorganic filler (D), it is preferred that the inorganic filler be added in an amount of 10 to 2,000 parts by mass, more preferably 20 to 1,200 parts by mass, even more preferably 40 to 1,000 parts by mass, per a total of 100 parts by mass of the components (A) to (C) and the component (E). Further, it is preferred that the inorganic filler be contained in the composition 2 by an amount of 30 to 95% by mass, more preferably 40 to 92% by mass, even more preferably 50 to 90% by mass, provided that the whole composition is of an amount of 100% by mass.

If the composition 2 contains the adhesion aid (E) having at least one epoxy group in one molecule, it is preferred that the adhesion aid be added in an amount of 0.1 to 20 parts by mass, more preferably 0.3 to 15 parts by mass, even more preferably 0.5 to 10 parts by mass, per the sum total of 100 parts by mass of the components (A) and (B).

Further, in the case where the component (E) is added to the composition 2, and where the composition 2 further contains the curing accelerator (C') for promoting the reaction of epoxy groups, other than the curing accelerator (C), the curing accelerator (C') is preferably added in an amount of 0.1 to 5 parts by mass, more preferably 0.3 to 4 parts by mass, even more preferably 0.5 to 3 parts by mass, per the sum total of 100 parts by mass of the components (A) and (B). When the amount of the curing accelerator (C') added is not smaller than 0.1 parts by mass, curing reaction will proceed in a sufficient manner; when the amount of the curing accelerator (C') added is not larger than 5 parts by mass, the heat-curable resin composition will exhibit a favorable storage stability.

Method for Producing Heat-Curable Resin Composition

There are no particular restrictions on a method for producing the heat-curable resin composition of the present invention. For example, there may be employed a method where the aforementioned components are combined together at given compounding ratios, followed by using a mixer or the like to sufficiently uniformly mix, stir, dissolve, disperse and/or melt-knead the components combined. These components may be combined all together at the same time, or combined in a separate manner; the components may be mixed or subjected to other treatments mentioned above while being heated if necessary.

While there are no particular restrictions on a device for performing mixing or the like, specific examples thereof include a kneader equipped with a stirring and a heating device, a twin roll mill, a triple roll mill, a ball mill, a planetary mixer and a mass colloider. These devices may be appropriately used in combination.

The heat-curable resin composition of the present invention is capable of being turned into a cured product with a high heat resistance, a low relative permittivity and a low dielectric tangent, as a result of being cured under conditions of temperature: 120 to 250° C.; time: 1 to 24 hours. Further, the composition may also be appropriately cured by methods described hereafter in accordance with an intended purpose or embodiment thereof which are also described in detail hereafter.

The heat-curable resin composition of the present invention is suitable for use in a wide range of applications such as a sealant for an electronic part device, a heat-curable adhesive agent, an adhesive film, a prepreg, a circuit board such as a multi-layered printed wiring board, a solder resist, an underfill material and a die bonding agent. Particularly, the heat-curable resin composition of the invention is suitable for use in a sealant for an electronic part device.

In accordance with various intended purposes, the heat-curable resin composition of the present invention may, for example, be used as it is after being produced by the abovementioned method, be used as a varnish, or be formed into the shape of a film (i.e. film-shaped laminating material) before use. In the case of a film-shaped laminating material, it is preferred that the heat-curable resin composition have a softening point of 40 to 140° C. in terms of lamination formability.

Varnish

A varnish in the present invention contains the heat-curable resin composition of the invention and an organic solvent. The varnish can be produced by, for example, combining the aforementioned components and an organic solvent at given compounding ratios, and then using a triple roll mill, a ball mill, a bead mill, a sand mill or the like to perform kneading as needed, or using a planetary mixer or the like to perform stirring as needed.

As an organic solvent used for turning the heat-curable resin composition of the invention into a varnish, there may be listed, for example, acetic acid esters such as ethyl acetate, butyl acetate, cellosolve acetate, propyleneglycol monomethylether acetate and carbitol acetate; carbitols such as cellosolve and butyl carbitol; aromatic hydrocarbons such as toluene and xylene; amide-based solvents such as dimethylformamide, dimethylacetamide and N-methyl pyrrolidone; and ketones such as acetone, methylethylketone and methylisobutyl ketone. Here, one kind of such organic solvent may be used alone, or two or more kinds thereof may be used in combination.

Further, as for a solid content concentration (non-volatile content concentration) of the heat-curable resin composition of the invention in the varnish, such concentration may be appropriately adjusted in accordance with a target use or embodiment. For example, it is preferred that the organic solvent(s) be added in a way such that the solid content concentration of the composition will be 30 to 90% by mass, more preferably 40 to 80% by mass.

Electronic Part

The heat-curable resin composition of the present invention is particularly useful as an encapsulation resin material for semiconductor devices of, for example, a transistor type, a module type, a DIP type, an SO type, a flatpack type and a ball grid array type. Particularly, the composition 2 is especially useful as a resin sealant for coils used in auto parts or the like. There are no particular restrictions on a method for encapsulating an electronic part(s), using the heat-curable resin composition of the present invention; for example, there may be employed transfer molding, injection molding and cast molding.

Heat-Curable Adhesive Agent

The heat-curable resin composition of the present invention may also be used as a heat-curable adhesive agent. For example, the composition of the invention may be used as an adhesive agent for a flexible printed circuit board, an adhesive agent for semiconductor elements or an adhesive agent for a housing component.

Film-Shaped Laminating Material

A film-shaped laminating material in the present invention is a material having a support and a resin composition layer that is provided on the support and is made of the heat-curable resin composition of the invention. As a method for producing the film-shaped laminating material, the heat-curable resin composition may be directly applied to the support, or turned into a varnish at first before being applied to the support by means of a die coater or the like. After applying the varnish, the organic solvent(s) will then be dried via, for example, heating or hot-air drying, thereby allowing the resin composition layer to be formed on the support.

Examples of the support (support film) include various plastic films; mold release papers; and metallic foils such as a copper foil and an aluminum foil. Specific examples of the various plastic films include polyolefin films such as a polyethylene film, a polypropylene film and a polyvinyl chloride film; polyester films such as a polyethylene terephthalate (PET) film and a polyethylene naphthalate film; polycarbonate films; and polyimide films. Here, in terms of versatility, a plastic film is preferred, and a PET film is more preferred. The support and a later-described protective film may be those that have already been surface-treated by MAD treatment, corona treatment or the like. Further, the support and the protective film may also be those that have already been subjected to a mold release treatment with the aid of a mold release agent such as a silicone resin-based mold release agent, an alkyd resin-based mold release agent and a fluorine resin-based mold release agent.

Adhesive Film

A specific embodiment of the film-shaped laminating material may be an adhesive film.

As a method for producing an adhesive film, there may be employed, for example, a method where a varnish is at first prepared by the abovementioned method, followed by applying this varnish to the support using a die coater or the like, and then drying the organic solvent(s) via, for example, heating or hot-air drying so as to form a resin composition layer. While there are no particular restrictions on drying conditions, it is preferred that drying be performed in a way such that the content of the organic solvent(s) in the resin composition layer will be not larger than 10% by mass, more preferably not larger than 5% by mass. Although depending on the amount of the organic solvent(s) contained in the varnish and the boiling point(s) of the organic solvent(s), when the varnish contains, for example, 30 to 60% by mass of the organic solvent(s), the resin composition layer can be formed by performing drying at 50 to 150° C. for about 3 to 10 minutes. Here, performing drying at a high temperature for a long period of time may cause the composition to harden as the curing reaction of the composition proceeds.

Further, as another method for producing an adhesive film, there may also be employed, for example, a method where an adhesive film is produced using an extruder equipped with a T-die. In this production method, instead of a varnish, there is used a heat-curable resin composition prepared by melting and mixing the components.

It is preferred that the resin composition layer of the adhesive film have a thickness of 10 to 120 Particularly, if the adhesive film is used in a later-described circuit board, it is preferred that the thickness of the resin composition layer of the adhesive film be not smaller than that of a conductor layer of the circuit board. Since a conductor layer of a circuit board usually has a thickness of 5 to 70 it is preferred that the resin composition layer have a thickness of 10 to 100 more preferably 15 to 80 μm in terms of achieving a thinner layer.

In addition, on a surface of the resin composition layer that is not in contact with the support, there may be further laminated a protective film similar to the support. In such case, the adhesive film includes the support; the resin composition layer formed on the support; and the protective film formed on the resin composition layer. While there are no particular restrictions on the thickness of the protective film, the thickness thereof may be 1 to 40 By laminating a protective film, dust or the like can be prevented from adhering to the surface of the resin composition layer, and scratches can be prevented from occurring thereon as well. The adhesive film can be rolled up and then stored in a rolled fashion.

Prepreg

A prepreg in the present invention contains the heat-curable resin composition of the invention, and can be produced by impregnating or coating a reinforcement base material with the heat-curable resin composition, and then semi-curing the heat-curable resin composition via heating.

As a reinforcement base material, there may be used those that are often used as base materials for prepregs, such as a glass cloth, a quartz glass, an aramid unwoven cloth and a liquid crystal polymer unwoven cloth.

As a method(s) for performing impregnation or coating, there may be listed a hot-melt method or a solvent method.

A hot-melt method refers to a method where a die coater is used to directly apply the heat-curable resin composition of the invention in a molten state to the reinforcement base material; or a method where the film-shaped laminating material produced by the abovementioned method is to be laminated on the reinforcement base material.

A solvent method is a method where the reinforcement base material is at first immersed into the varnish produced by the abovementioned method, followed by drying the same.

Further, the prepreg may also be prepared by continuously performing thermal lamination from both surfaces of the reinforcement base material, using the adhesive film(s) produced by the abovementioned method and under a heated and pressurized condition. As for a support and a protective film, those that are employed in the aforementioned adhesive film may be used.

By heating the reinforcement base material impregnated or coated with the heat-curable resin composition of the invention at, for example, 60 to 150° C. for 5 to 60 min, this heat-curable resin composition will be in a semi-cured state. It is preferred that the prepreg of the present invention contain 25 to 75% by mass of the heat-curable resin composition of the invention with respect to the reinforcement base material.

Circuit Board (Multi-Layered Printed-Wiring Board)

A circuit board in the present invention has an insulation layer as a cured product of the heat-curable resin composition of the invention. Here, a circuit board refers to a configuration where a patterned conductor layer (circuit) is formed on one or both surfaces of a substrate; the circuit board may also include a multi-layered printed-wiring board in which a conductor layer(s) and an insulation layer(s) are alternately laminated on top of one another, and a patterned conductor layer (circuit) is formed on one or both surfaces of the outermost layer. Here, the surface of the conductor layer may be a surface that has already been subjected to a roughening treatment such as a blackening treatment and copper etching.

As a method for forming an insulation layer on the circuit board, there may be employed, for example, a method where the varnish prepared by the abovementioned method is to be applied to the circuit board, followed by performing drying, and then heating so as to cure the same. Specifically, there may be employed, for example, a method where a dispenser is used to apply the varnish to the circuit board, followed by performing drying at 60 to 150° C. for 0.5 to 2 hours, and then curing the same by performing heating at 120 to 250° C. for 1 to 12 hours. Moreover, vacuum drying may be performed if necessary.

Further, as another method for forming an insulation layer on the circuit board, there may also be employed, for example, a method where the film-shaped laminating material is to be laminated on one or both surfaces of the circuit board, using a vacuum laminator (lamination treatment). When the film-shaped laminating material has the protective film, the protective film is to be removed at first, followed by preheating the film-shaped laminating material and the circuit board if necessary, and then laminating the film-shaped laminating material on the circuit board while performing pressurization and heating. In vacuum lamination, it is preferred that a temperature for heating and press-bonding be 60 to 160° C., that a pressure for heating and press-bonding be 0.1 to 1.8 MPa, and that a time period for heating and press-bonding be 20 to 400 sec. After completing such lamination process, it is preferred, for example, that the film-shaped laminating material laminated be smoothed by being hot-pressed under a normal pressure. Conditions for smoothing may be similar to the conditions for performing heating and press-bonding in the lamination process. Smoothing may be performed using a commercially available laminator. Here, the lamination process and smoothing may be performed in a continuous manner using a commercially available vacuum laminator.

After laminating the film-shaped laminating material on the circuit board and then cooling them to near room temperature, the support will be peeled off if it needs to be peeled off, followed by heating the resin composition so as to cure the same, thereby forming an insulation layer(s). Here, the order and the like in which the support is peeled off may be appropriately changed. In this way, an insulation layer(s) can be formed on the circuit board. Conditions for performing heating and curing may be appropriately selected based on, for example, the types as well as amounts of the resin components contained in the resin composition; it is preferred that the conditions for performing heating and curing be selected from ranges of 150 to 220° C. for 20 to 180 min, more preferably 160 to 210° C. for 30 to 120 min.

In addition, as yet another method for forming an insulation layer on the circuit board, there may also be employed, for example, a method where the film-shaped laminating material produced by the abovementioned method is to be laminated on one or both surfaces of the circuit board, using a vacuum press machine. In this method, by using a general vacuum hot press machine to perform heating and pressurization under a reduced pressure, the resin composition will turn into an insulation layer on the circuit board after being heated and cured.

Moreover, there may also be employed, for example, a method for producing a circuit board (multi-layered printed-wiring board), using the prepreg produced by the abovementioned method. Such circuit board can be produced by stacking one or more pieces of the prepreg of the present invention on an inner circuit board, sandwiching a metal plate therebetween through a mold release film, and then performing press-laminating under a heated condition.

After producing the circuit board, via holes and through holes may be formed by performing a boring process on the insulation layer formed on the circuit board, a roughening treatment may be performed on the surface of the insulation layer, and/or a conductor layer may be produced by plating the insulation layer. These processes may be performed in accordance with methods for producing a general circuit board or multi-layered printed-wiring board.

WORKING EXAMPLE

The invention is described in detail hereunder with reference to working and comparative examples. However, the present invention is not limited to the following working examples.

Components used in the working and comparative examples are shown below. In the following descriptions, the expression "part(s)" indicating the amounts of the components added refers to part(s) by mass.

Further, the composition ratios of the monomers and oligomers in the component (A) are values calculated based on area ratios of peaks measured by GPC.

(A) Cyclopentadiene Compound
(A-1) Monosubstituted cyclopentadiene compound

Synthetic Example 1

Sodium hydride of 17.6 g (1.1 equivalents, 60%, dispersed in liquid paraffin) was added to a 500 mL glass four-necked flask equipped with a stirrer, a cooling condenser and a thermometer, followed by using hexane to perform washing so as to remove from the system the liquid paraffin in which the sodium hydride was dispersed. Next, tetrahydrofuran of 250 mL was added to the four-necked flask, and the atmosphere in the system was then turned into a nitrogen atmosphere. Stirring was then performed intensely while delivering thereinto 26.4 g (1.0 equivalent) of cyclopentadiene by drops at 0° C., and a hydrogen gas generated was released out of the system. After completing delivering all the cyclopentadiene by drops, the temperature in the system was raised to 60° C., and 54.9 g (0.9 equivalents) of 4-(chloromethyl)styrene was then delivered thereinto by drops before performing stirring at 60° C. for 30 min. Next, 50 g of water was added to stop the reaction, and the tetrahydrofuran was distilled away under a reduced pressure. A mixed solvent of xylene and hexane (50% by volume) was added to dilute an organic layer, followed by performing washing several times using hydrochloric acid (10% by mass) and water. After separating an aqueous layer, anhydrous sodium sulfate was added to the organic layer to dehydrate the same, followed by distilling away the solvent under a reduced pressure, thereby obtaining a product (A'-1). The composition of the product (A'-1) is shown in Table 1. A monomer (4-(cyclopentadienylmethyl)styrene) contained in the product (A'-1) could be easily oligomerized at room temperature, and the product (A'-1) contained an oligomer (oligomer of 4-(cyclopentadienylmethyl)styrene) with the aforementioned monomer serving as a monomer.

Next, the product (A'-1) obtained was added to a 500 mL glass four-necked flask equipped with a stirrer, a cooling condenser and a thermometer, followed by performing stirring at 80° C. for an hour under vacuum so as to cause oligomerization involving dimerization of part of the cyclopentadienyl groups, thereby obtaining a product (A-1). The composition of the product (A-1) is shown in Table 1, and the following formula represents the structure of a dimer of the monomer that is contained in the product (A-1). Further, the weight-average molecular weight (Mw) of the product (A-1) was 2,400.

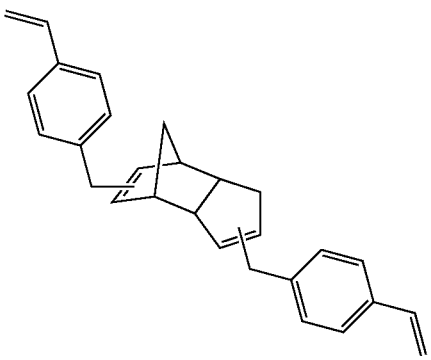

(A-2) Disubstituted cyclopentadiene compound

Synthetic Example 2

Sodium hydride of 33.6 g (2.1 equivalents, 60%, dispersed in liquid paraffin) was added to a 500 mL glass four-necked flask equipped with a stirrer, a cooling condenser and a thermometer, followed by using hexane to perform washing so as to remove from the system the liquid paraffin in which the sodium hydride was dispersed. Next, tetrahydrofuran of 250 mL was added to the four-necked flask, and the atmosphere in the system was then turned into a nitrogen atmosphere. Stirring was then performed intensely while delivering thereinto 26.4 g (1.0 equivalent) of cyclopentadiene by drops at 0° C., and a hydrogen gas generated was released out of the system. After completing delivering all the cyclopentadiene by drops, the temperature in the system was raised to 60° C., and a mixture of 45.8 g (0.75 equivalents) of 4-(chloromethyl)styrene and 12.7 g (0.25 equivalents) of benzyl chloride was then delivered thereinto by drops before performing stirring at 60° C. for 30 min. Next, 30.6 g (1.0 equivalent) of allyl chloride was delivered thereinto by drops, and stirring was then performed at 60° C. for another 30 min. Water of 50 g was added to stop the reaction, and the tetrahydrofuran was then distilled away under a reduced pressure. A mixed solvent of xylene and hexane (50% by volume) was added to dilute an organic layer, followed by performing washing several times using hydrochloric acid (10% by mass) and water. After separating an aqueous layer, anhydrous sodium sulfate was added to the organic layer to dehydrate the same, followed by distilling away the solvent under a reduced pressure, thereby obtaining a product (A'-2). The composition of the product (A'-2) is shown in Table 1. Monomers (4-(allylcyclopentadienyl methyl)styrene and 4-(allylcyclopentadienyl methyl)benzene) contained in the product (A'-2) could be easily oligomerized at room temperature, and the product (A'-2) contained oligomers (oligomer of 4-(allylcyclopentadienyl methyl)styrene, oligomer of 4-(allylcyclopentadienyl methyl)benzene, and oligomer of 4-(allylcyclopentadienyl methyl)styrene and 4-(allylcyclopentadienyl methyl)benzene) with the aforementioned monomers serving as monomers.

Next, the product (A'-2) obtained was added to a 500 mL glass four-necked flask equipped with a stirrer, a cooling condenser and a thermometer, followed by performing stirring at 80° C. for an hour under vacuum so as to cause oligomerization involving dimerization of part of the cyclopentadienyl groups, thereby obtaining a product (A-2). The composition of the product (A-2) is shown in Table 1, and the following formula represents the structure of a dimer of the monomer(s) that is contained in the product (A-2). Further, the weight-average molecular weight (Mw) of the product (A-2) was 3,000.

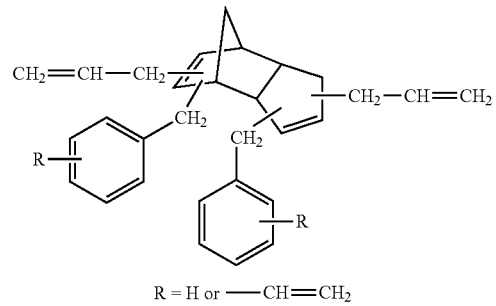

TABLE 1

| Product | Monomer (% by mass) | Oligomer (% by mass) |
| --- | --- | --- |
| (A'-1) | 70 | 30 |
| (A-1) | 30 | 70 (20) |
| (A'-2) | 80 | 20 |
| (A-2) | 35 | 65 (15) |

As for ratios of oligomers in the products (A-1) and (A-2) in Table 1, values in the brackets represent ratios of dimers in the products.

(B) Cyclic Imide Compound (B-1): Linear alkylene group-containing maleimide compound 1 represented by the following formula (BMI-1500 by Designer Molecules Inc., weight-average molecular weight 4,000)

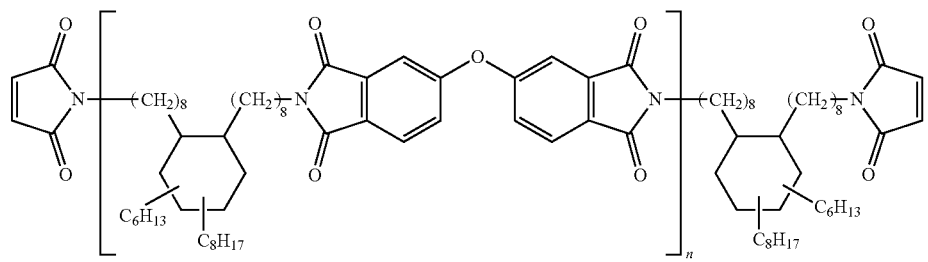

n = 1~10

(B-2): Linear alkylene group-containing maleimide compound 2 represented by the following formula (BMI-3000 by Designer Molecules Inc., weight-average molecular weight 9,000)

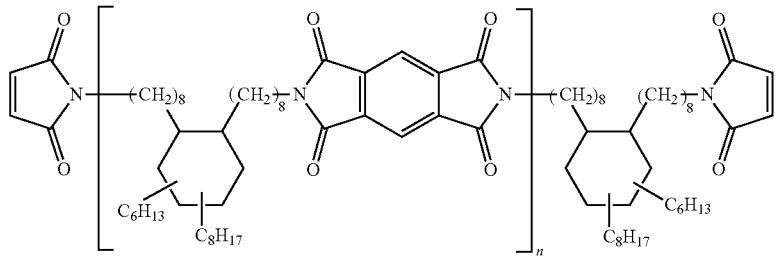

n = 1~10

(B-3): Linear alkylene group-containing maleimide compound 3 represented by the following formula (BMI-5000 by Designer Molecules Inc., weight-average molecular weight 21,500)

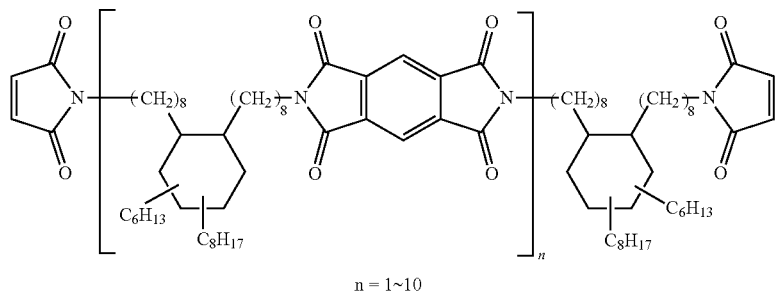

n = 1~10

(B-4): 4,4'-diphenylmethanebismaleimide (BMI by KI Chemical Industry Co., LTD.)
(C) Curing Accelerator
(C-1) Dicumylperoxide (PERCUMYL D by NOF CORPORATION)
(D) Inorganic Filler
(D-1) Molten spherical silica (RS-8225/53C by TATSUMORI LTD.)
(D-2) a silica that has been subjected to a dry surface treatment using 0.3 parts of 3-aminopropyltrimethoxysilane (KBM-903 by Shin-Etsu Chemical Co., Ltd.) per 100 pats of (D-1)
(D-3) a silica that has been subjected to a dry surface treatment using 0.3 parts of N-phenyl-3-aminopropyltrimethoxysilane (KBM-573 by Shin-Etsu Chemical Co., Ltd.) per 100 pats of (D-1)
(D-4) a silica that has been subjected to a dry surface treatment using 0.3 parts of 3-methacryloxypropyltrimethoxysilane (KBM-503 by Shin-Etsu Chemical Co., Ltd.) per 100 pats of (D-1)
(D-5) a silica that has been subjected to a dry surface treatment using 0.3 parts of vinyltrimethoxysilane (KBM-1003 by Shin-Etsu Chemical Co., Ltd.) per 100 pats of (D-1)
(D-6) a silica that has been subjected to a dry surface treatment using 0.3 parts of p-styryltrimethoxysilane (KBM-1403 by Shin-Etsu Chemical Co., Ltd.) per 100 pats of (D-1)
(E) Adhesion aid having at least one epoxy group in one molecule (E-1) Isocyanuric acid type epoxy resin (TEPIC-S by Nissan Chemical Corporation) (E-2) 3-Glycidoxypropyltrimethoxysilane (KBM-403 by Shin-Etsu Chemical Co., Ltd.)

Working Examples 1 to 14; Comparative Examples 1 and 2

A mixer was used to mix the components at the compounding ratios (parts by mass) shown in Table 2, followed by using a triple roll mill to further mix them so as to obtain a resin composition.

Working Examples 15 to 30; Comparative Examples 3 to 5

The components were dissolved and dispersed in toluene at compounding ratios (parts by mass) shown in Table 3, and adjustment was performed so that nonvolatile contents would be in an amount of 70% by mass, thereby obtaining a varnish of a resin composition. This varnish was then used to evaluate a relative permittivity and dielectric tangent.

In addition, the components were melted and mixed at the compounding ratios (pars by mass) shown in Table 3, using a triple roll mill. A resin composition was obtained after performing cooling. This resin composition was used to evaluate a long-term heat resistance, a tracking resistance (CTI) and adhesiveness.

Glass-Transition Temperature

The resin composition was poured into a mold, and then cured by a step-wise curing process where the resin composition was at first heated at 150° C. for an hour, and then at 180° C. for another two hours, thereby obtaining a cured product of a size of 5 mm×5 mm×15 mm. These cured products were then placed into a thermal dilatometer (TMA8140C by Rigaku Corporation). A rate of temperature rise in a temperature rise program was set to 5° C./min, and it was made sure that a constant load of 49 mN be applied to a test specimen(s) of the cured product; changes in the dimensions of the test specimens were then measured under these settings as the temperature rose from −60° C. to 300° C. Correlations between such changes in dimensions and temperatures were plotted on a graph. A glass-transition temperature was then obtained based on this graph showing the correlations between the changes in dimensions and temperatures.

Relative Permittivity, Dielectric Tangent

A roller coater was used to apply the resin composition to a PET film having a thickness of 38 μm in an way such that the resin composition would eventually have a thickness of 50 μm after drying, followed by curing the resin composition via a step-wise curing process where the resin composition was at first heated at 150° C. for an hour, and then at 180° C. for another two hours. Next, a network analyzer (E5063-2D5 by Keysight Technologies) and a stripline (by KEYCOM Corp.) were connected to the film to measure a relative permittivity and a dielectric tangent thereof at a frequency of 10 GHz.

Long-Term Heat Resistance Test

The resin composition was poured into a mold, and then cured by a step-wise curing process where the resin composition was at first heated at 150° C. for an hour, and then at 180° C. for another two hours, thereby obtaining a cured product of a size of 50 mmφ×3 mmt. The cured product was then stored in a thermostatic device of 250° C. for 1,000 hours, and the mass of the cured product was measured after the storage was over. Evaluated was a mass retention rate calculated by [mass of cured product after storage/mass of cured product before storage]×100(%).

Water Absorption Rate

The resin composition was poured into a mold, and then cured by a step-wise curing process where the resin composition was at first heated at 150° C. for an hour, and then at 180° C. for another two hours, thereby obtaining a cured product of a size of 50 mmφ×3 mmt. Measured was the weight of the cured product before and after being treated under a saturated water vapor of 121° C., 2.1 atm for 24 hours, and a water absorption rate was then calculated based on a rate of increase in weight.

Tracking Resistance (CTI) Test

The resin composition was poured into a mold, followed by performing heating at 150° C. for an hour, and then at 180° C. for another two hours so as to cure the resin composition in a step-wise manner, thus obtaining a cured product of a size of 50 mmφ×3 mmt. Using this cured product, a tracking resistance test was performed based on a method described in JIS C 2134 (IEC 60112). Tracking resistance was evaluated by measuring five pieces of such cured product i.e. n=5, where as a tracking resistance voltage, measured was a maximum voltage at which all the cured products would not break even after being subjected to 50 or more drops of a 0.1% ammonium chloride aqueous solution. Here, 600 V was set as the upper limit.

Adhesion Test with Silicon

The resin composition was applied to a silicon chip of a size of 10 mm×10 mm in a way such that an adherend area would become 4 mm$^2$, followed by placing another silicon chip thereon, and then curing the resin composition via a step-wise curing process where the resin composition was at first heated at 150° C. for an hour, and then at 180° C. for another two hours, thereby obtaining a test specimen. A bond tester, DAGE-SERIES-4000PXY (by Nordson Advanced Technology (Japan) K.K.) was used to measure a shear adhesion force of the test specimen at room temperature (25° C.), as a form of adhesion force evaluation.

Adhesion Test with Copper

The resin composition was applied to a copper frame of a size of 10 mm×10 mm in a way such that an adherend area would become 4 mm$^2$, followed by placing a silicon chip thereon, and then curing the resin composition via a step-wise curing process where the resin composition was at first heated at 150° C. for an hour, and then at 180° C. for another two hours, thereby obtaining a test specimen. A bond tester, DAGE-SERIES-4000PXY (by Nordson Advanced Technology (Japan) K.K.) was used to measure a shear adhesion force of the test specimen at room temperature (25° C.), as a form of adhesion force evaluation.

Bending Strength, Bending Elastic Modulus

The resin composition was poured into a mold manufactured in accordance with a standard described in JIS K 6911:2006, followed by performing a step-wise curing process where the resin composition was at first heated at 150° C. for an hour, and then at 180° C. for another two hours, thereby obtaining a test specimen. A bending strength and a bending elastic modulus of the test specimen thus obtained were then measured at room temperature (25° C.) in accordance with a standard described in JIS K 6911:2006.

TABLE 2

|  |  |  | Working example | | | | | | | |
|---|---|---|---|---|---|---|---|---|---|---|
|  |  |  | 1 | 2 | 3 | 4 | 5 | 6 | 7 | 8 |
| (A) | (A-1) | Monosubstituted cyclopentadiene compound | 100 |  | 100 |  | 100 |  | 100 | 100 |
|  | (A-2) | Disubstituted cyclopentadiene compound |  | 100 |  | 100 |  | 100 |  |  |
| (C) | (C-1) | Dicumylperoxide (PERCUMYL D by NOF CORPORATION) | 1 | 1 | 1 | 1 | 1 | 1 | 1 | 1 |
| (D) | (D-1) | Molten spherical silica (RS-8225/53C by TATSUMORI LTD.) | 236 | 236 | 152 | 152 | 403 | 403 |  |  |
|  | (D-2) | Silica that has been subjected to dry surface treatment using 3-aminopropyltrimethoxysilane (KBM-903 by Shin-Etsu Chemical Co., Ltd.) |  |  |  |  |  |  | 236 |  |
|  | (D-3) | Silica that has been subjected to dry surface treatment using N-phenyl-3-aminopropyltri-methoxysilane (KBM-573 by Shin-Etsu Chemical Co., Ltd.) |  |  |  |  |  |  |  | 236 |
|  | (D-4) | Silica that has been subjected to dry surface treatment using 3-methacryloxypropyltri-methoxysilane (KBM-503 by Shin-Etsu Chemical Co., Ltd.) |  |  |  |  |  |  |  |  |
|  | (D-5) | Silica that has been subjected to dry surface treatment using vinyltrimethoxysilane (KBM-1003 by Shin-Etsu Chemical Co., Ltd.) |  |  |  |  |  |  |  |  |
|  | (D-6) | Silica that has been subjected to dry surface treatment using p-styryltrimethoxysilane (KBM-1403 by Shin-Etsu Chemical Co., Ltd.) |  |  |  |  |  |  |  |  |

TABLE 2-continued

| | | | | | | | | | | |
|---|---|---|---|---|---|---|---|---|---|---|
| (E) | (E-1) | Isocyanuric acid type epoxy resin (TEPIC-S by Nissan Chemical Corporation) | | | | | | | | |
| | (E-2) | 3-glycidoxypropyltrimethoxysilane (KBM-403 by Shin-Etsu Chemical Co., Ltd.) | | | | | | | | |
| Property evaluation | Tg (° C.) | | 229 | 237 | 229 | 238 | 230 | 238 | 230 | 232 |
| | Relative permittivity | | 2.7 | 2.8 | 2.7 | 2.7 | 2.8 | 2.9 | 2.9 | 2.8 |
| | Dielectric tangent | | 0.004 | 0.004 | 0.004 | 0.004 | 0.003 | 0.003 | 0.003 | 0.003 |
| | Mass retention rate after stored at 250° C. (%) | | 99 | 99 | 99 | 99 | 99 | 99 | 99 | 99 |
| | Water absorption rate (%) | | 0.2 | 0.2 | 0.3 | 0.3 | 0.2 | 0.2 | 0.2 | 0.2 |
| | Shear adhesion force to silicon (MPa) | | 12 | 14 | 12 | 14 | 13 | 14 | 20 | 22 |
| | Shear adhesion force to copper (MPa) | | 15 | 17 | 16 | 17 | 15 | 18 | 23 | 25 |
| | Bending strength (MPa) | | 35 | 36 | 30 | 32 | 48 | 47 | 60 | 72 |
| | Bending elastic modulus (MPa) | | 9100 | 9200 | 7000 | 7200 | 11000 | 12000 | 9400 | 9100 |

| | | | Working example | | | | | | Comparative example | |
|---|---|---|---|---|---|---|---|---|---|---|
| | | | 9 | 10 | 11 | 12 | 13 | 14 | 1 | 2 |
| (A) | (A-1) | Monosubstituted cyclopentadiene compound | 100 | 100 | 100 | 100 | 100 | 100 | 100 | |
| | (A-2) | Disubstituted cyclopentadiene compound | | | | | | | | 100 |
| (C) | (C-1) | Dicumylperoxide (PERCUMYL D by NOF CORPORATION) | 1 | 1 | 1 | 1 | 1 | 1 | 1 | 1 |
| (D) | (D-1) | Molten spherical silica (RS-8225/53C by TATSUMORI LTD.) | | | | 238 | 238 | | | |
| | (D-2) | Silica that has been subjected to dry surface treatment using 3-aminopropyltrimethoxysilane (KBM-903 by Shin-Etsu Chemical Co., Ltd.) | | | | | | | | |
| | (D-3) | Silica that has been subjected to dry surface treatment using N-phenyl-3-aminopropyltri-methoxysilane (KBM-573 by Shin-Etsu Chemical Co., Ltd.) | | | | | | 238 | | |
| | (D-4) | Silica that has been subjected to dry surface treatment using 3-methacryloxypropyltri-methoxysilane (KBM-503 by Shin-Etsu Chemical Co., Ltd.) | 236 | | | | | | | |
| | (D-5) | Silica that has been subjected to dry surface treatment using vinyltrimethoxysilane (KBM-1003 by Shin-Etsu Chemical Co., Ltd.) | | 236 | | | | | | |
| | (D-6) | Silica that has been subjected to dry surface treatment using p-styryltrimethoxysilane (KBM-1403 by Shin-Etsu Chemical Co., Ltd.) | | | 236 | | | | | |
| (E) | (E-1) | Isocyanuric acid type epoxy resin (TEPIC-S by Nissan Chemical Corporation) | | | | 1 | | 1 | | |
| | (E-2) | 3-glycidoxypropyltrimethoxysilane (KBM-403 by Shin-Etsu Chemical Co., Ltd.) | | | | | 1 | | | |
| Property evaluation | Tg (° C.) | | 231 | 234 | 230 | 229 | 229 | 232 | 228 | 235 |
| | Relative permittivity | | 2.8 | 2.9 | 2.8 | 27 | 2.7 | 2.8 | 2.6 | 2.6 |
| | Dielectric tangent | | 0.003 | 0.003 | 0.003 | 0.004 | 0.004 | 0.003 | 0.005 | 0.005 |
| | Mass retention rate after stored at 250° C. (%) | | 99 | 99 | 99 | 99 | 99 | 99 | 99 | 99 |
| | Water absorption rate (%) | | 0.3 | 0.2 | 0.2 | 0.2 | 0.2 | 0.2 | 0.5 | 0.5 |
| | Shear adhesion force to silicon (MPa) | | 21 | 15 | 15 | 41 | 44 | 47 | 11 | 12 |
| | Shear adhesion force to copper (MPa) | | 24 | 17 | 16 | 45 | 40 | 50 | 12 | 15 |
| | Bending strength (MPa) | | 52 | 35 | 42 | 35 | 35 | 72 | 25 | 26 |
| | Bending elastic modulus (MPa) | | 9000 | 7500 | 8300 | 9100 | 9100 | 9100 | 3100 | 3200 |

As shown in Table 2, the cured product of the resin composition of the present invention has a high glass-transition temperature (Tg), low values of relative permittivity and dielectric tangent, and a superior long-term heat resistance. Further, the cured product of the resin composition of the invention exhibited a low water absorption rate. Thus, the resin composition of the present invention is preferable as a material for use in high-frequency devices.

TABLE 3

| | | | Working example | | | | | | | | | |
|---|---|---|---|---|---|---|---|---|---|---|---|---|
| | | | 15 | 16 | 17 | 18 | 19 | 20 | 21 | 22 | 23 | 24 |
| (A) | (A-1) | Monosubstituted cyclopentadiene compound | 50 | 50 | 70 | 50 | 70 | 50 | 50 | 50 | 50 | 50 |
| | (A-2) | Disubstituted cyclopentadiene compound | | | | | | | | | | |
| (B) | (B-1) | BMI-1500 | 50 | 50 | 30 | 50 | 30 | 50 | 50 | 50 | 50 | 50 |
| | (B-2) | BMI-3000 | | | | | | | | | | |
| | (B-3) | BMI-3000 | | | | | | | | | | |
| | (B-4) | 4,4'-diphenylmethanebis-maleimide | | | | | | | | | | |
| (C) | (C-1) | Dicumylperoxide (PERCUMYL D by NOF CORPORATION) | | 1 | 1 | 1 | 1 | 1 | 1 | 1 | 1 | 1 |
| (D) | (D-1) | Molten spherical silica (RS-8225/53C by TATSUMORI LTD.) | | | | 236 | 236 | | | | | |
| | (D-2) | Silica that has been subjected to dry surface treatment using 3-aminopropyltrimethoxysilane (KBM-903 by Shin-Etsu Chemical Co., Ltd.) | | | | | | 236 | | | | |
| | (D-3) | Silica that has been subjected to dry surface treatment using N-phenyl-3-aminopropyl-trimethoxysilane (KBM-573 by Shin-Etsu Chemical Co., Ltd.) | | | | | | | 236 | | | |
| | (D-4) | Silica that has been subjected to dry surface treatment using 3-methacryloxypropyl-trimethoxysilane (KBM-503 by Shin-Etsu Chemical Co., Ltd.) | | | | | | | | 236 | | |
| | (D-5) | Silica that has been subjected to dry surface treatment using vinyltrimethoxysilane (KBM-1003 by Shin-Etsu Chemical Co., Ltd.) | | | | | | | | | 236 | |
| | (D-6) | Silica that has been subjected to dry surface treatment using p-styryltrimethoxysilane (KBM-1403 by Shin-Etsu Chemical Co., Ltd.) | | | | | | | | | | 236 |
| (E) | (E-1) | Isocyanuric acid type epoxy resin (TEPIC-S by Nissan Chemical Corporation) | | | | | | | | | | |
| | (E-2) | 3-glycidoxypropyl-trimethoxysilane (KBM-403 by Shin-Etsu Chemical Co., Ltd.) | | | | | | | | | | |
| Property evaluation | | Relative permittivity | 2.4 | 2.4 | 2.4 | 2.5 | 2.5 | 2.5 | 2.5 | 2.5 | 2.5 | 2.5 |
| | | Dielectric tangent | 0.003 | 0.003 | 0.004 | 0.002 | 0.003 | 0.002 | 0.002 | 0.002 | 0.002 | 0.002 |
| | | Mass retention rate after stored at 250° C. (%) | 96 | 98 | 99 | 99 | 99 | 99 | 99 | 99 | 99 | 99 |
| | | CTI (V) | 600 | 600 | 500 | 600 | 575 | 600 | 600 | 600 | 600 | 600 |
| | | Shear adhesion force to silicon (MPa) | 22 | 22 | 18 | 23 | 19 | 24 | 26 | 25 | 22 | 22 |
| | | Shear adhesion force to copper (MPa) | 24 | 24 | 19 | 25 | 20 | 26 | 29 | 28 | 24 | 23 |

| | | | Working example | | | | | | Comparative example | | |
|---|---|---|---|---|---|---|---|---|---|---|---|
| | | | 25 | 26 | 27 | 28 | 29 | 30 | 3 | 4 | 5 |
| (A) | (A-1) | Monosubstituted cyclopentadiene compound | 50 | 50 | 50 | 50 | 50 | | 100 | | 50 |

TABLE 3-continued

| | | | | | | | | | | | |
|---|---|---|---|---|---|---|---|---|---|---|---|
| | (A-2) | Disubstituted cyclopentadiene compound | | | | | | | 50 | 100 | |
| (B) | (B-1) | BMI-1500 | 50 | 50 | | | | 50 | | | |
| | (B-2) | BMI-3000 | | | 50 | 50 | | | | | |
| | (B-3) | BMI-3000 | | | | | 50 | | | | |
| | (B-4) | 4,4'-diphenylmethanebis-maleimide | | | | | | | | | 50 |
| (C) | (C-1) | Dicumylperoxide (PERCUMYL D by NOF CORPORATION) | 1 | 1 | 1 | 1 | 1 | 1 | 1 | 1 | 1 |
| (D) | (D-1) | Molten spherical silica (RS-8225/53C byTATSUMORI LTD.) | 238 | 238 | | | | | | | |
| | (D-2) | Silica that has been subjected to dry surface treatment using 3-aminopropyltrimethoxysilane (KBM-903 by Shin-Etsu Chemical Co., Ltd.) | | | | | | | | | |
| | (D-3) | Silica that has been subjected to dry surface treatment using N-phenyl-3-aminopropyl-trimethoxysilane (KBM-573 by Shin-Etsu Chemical Co., Ltd.) | | | | | | | | | |
| | (D-4) | Silica that has been subjected to dry surface treatment using 3-methacryloxypropyl-trimethoxysilane (KBM-503 by Shin-Etsu Chemical Co., Ltd.) | | | | | | | | | |
| | (D-5) | Silica that has been subjected to dry surface treatment using vinyltrimethoxysilane (KBM-1003 by Shin-Etsu Chemical Co., Ltd.) | | | | | | | | | |
| | (D-6) | Silica that has been subjected to dry surface treatment using p-styryltrimethoxysilane (KBM-1403 by Shin-Etsu Chemical Co., Ltd.) | | | | | | | | | |
| (E) | (E-1) | Isocyanuric acid type epoxy resin (TEPIC-S by Nissan Chemical Corporation) | 1 | | | | | | | | |
| | (E-2) | 3-glycidoxypropyl-trimethoxysilane (KBM-403 by Shin-Etsu Chemical Co., Ltd.) | | 1 | | | | | | | |
| Property evaluation | | Relative permittivity | 2.5 | 2.5 | 2.4 | 2.4 | 2.3 | 2.4 | 2.6 | 2.6 | 3.2 |
| | | Dielectric tangent | 0.002 | 0.002 | 0.003 | 0.003 | 0.003 | 0.003 | 0.005 | 0.005 | 0.010 |
| | | Mass retention rate after stored at 250° C. (%) | 99 | 99 | 97 | 99 | 99 | 98 | 99 | 99 | 94 |
| | | CTI (V) | 600 | 600 | 600 | 600 | 600 | 600 | 125 | 120 | 400 |
| | | Shear adhesion force to silicon (MPa) | 49 | 48 | 20 | 21 | 22 | 23 | 11 | 12 | 20 |
| | | Shear adhesion force to copper (MPa) | 52 | 51 | 23 | 23 | 23 | 25 | 12 | 15 | 21 |

As shown in Table 3, the cured product of the resin composition of the present invention exhibits lower values of relative permittivity and dielectric tangent, and has a superior long-term heat resistance and a high tracking resistance. Thus, the resin composition of the present invention is suitable as a material for use in high-frequency devices and power devices.

What is claimed is:

1. A heat-curable resin composition comprising:
   (A) a cyclopentadiene compound represented by the following formula (1) and/or an oligomer(s) of the cyclopentadiene compound

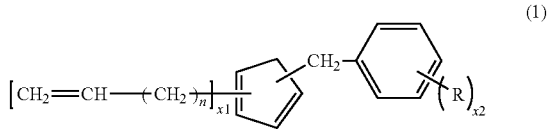

(1)

wherein R represents a group selected from an alkyl group having 1 to 6 carbon atoms, an alkenyl group having 2 to 6 carbon atoms and an aryl group having 6 to 10 carbon atoms, n represents an integer of 1 to 4, each of x1 and x2 independently represents 0, 1 or 2, provided that when R represents an alkyl group or an aryl group, x1 represents 1 or 2, and x1 and x2 satisfy 1≤x1+x2≤4;
(C) a curing accelerator; and
(D) an inorganic filler.

2. The heat-curable resin composition according to claim 1, wherein the oligomer(s) of the compound represented by the formula (1) as the component (A) includes a dimer(s) and/or trimer(s) of the compound represented by the formula (1).

3. The heat-curable resin composition according to claim 1, wherein the oligomer(s) of the compound represented by the formula (1) as the component (A) has a dicyclopentadiene ring.

4. The heat-curable resin composition according to claim 1, wherein the oligomer(s) of the compound represented by the formula (1) is present in the component (A) at a ratio of 10 to 90% by mass.

5. The heat-curable resin composition according to claim 1, wherein the component (D) is surface-treated with a silane coupling agent having an amino group, a methacryl group, a vinyl group or a styryl group.

6. The heat-curable resin composition according to claim 1, further comprising:
(E) an adhesion aid having at least one epoxy group in one molecule.

7. A heat-curable resin composition comprising:
(A) a cyclopentadiene compound represented by the following formula (1) and/or an oligomer(s) of the cyclopentadiene compound

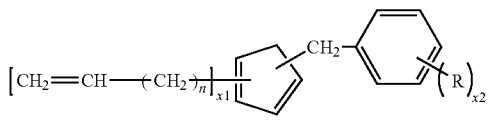
(1)

wherein R represents a group selected from an alkyl group having 1 to 6 carbon atoms, an alkenyl group having 2 to 6 carbon atoms and an aryl group having 6 to 10 carbon atoms, n represents an integer of 1 to 4, each of x1 and x2 independently represents 0, 1 or 2, provided that when R represents an alkyl group or an aryl group, x1 represents 1 or 2, and x1 and x2 satisfy 1≤x1+x2≤4; and
(B) a cyclic imide compound having, in one molecule, at least one dimer acid backbone, at least one linear alkylene group having not less than six carbon atoms and at least two unsaturated cyclic imide groups, wherein the component (B) is in an amount of 5 to 95 parts by mass per a sum total of 100 parts by mass of the components (A) and (B).

8. The heat-curable resin composition according to claim 7, wherein the oligomer(s) of the compound represented by the formula (1) as the component (A) includes a dimer(s) and/or trimer(s) of the compound represented by the formula (1).

9. The heat-curable resin composition according to claim 7, wherein the oligomer(s) of the compound represented by the formula (1) as the component (A) has a dicyclopentadiene ring.

10. The heat-curable resin composition according to claim 7, wherein the oligomer(s) of the compound represented by the formula (1) is present in the component (A) at a ratio of 10 to 90% by mass.

11. The heat-curable resin composition according to claim 7, wherein the cyclic imide compound (B) is represented by the following formula (2):

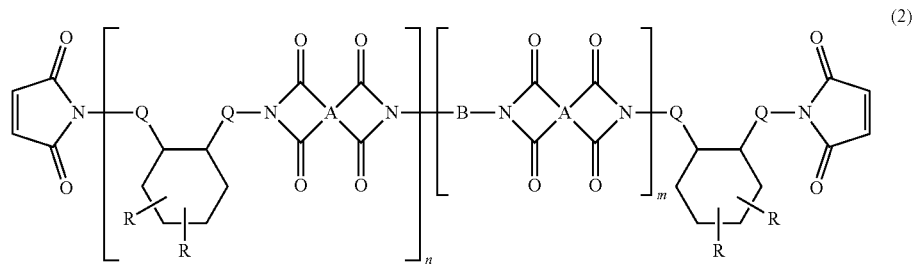
(2)

wherein A independently represents a tetravalent organic group having an aromatic ring or aliphatic ring; B represents an alkylene group that has 6 to 18 carbon atoms and a divalent aliphatic ring that may contain a hetero atom; Q independently represents a linear alkylene group having not less than 6 carbon atoms; R independently represents a linear or branched alkyl group having not less than 6 carbon atoms; n represents a number of 1 to 10; m represents a number of 0 to 10.

12. The heat-curable resin composition according to claim 11, wherein the organic group represented by A in the formula (2) is a group expressed by any one of the following structural formulae:

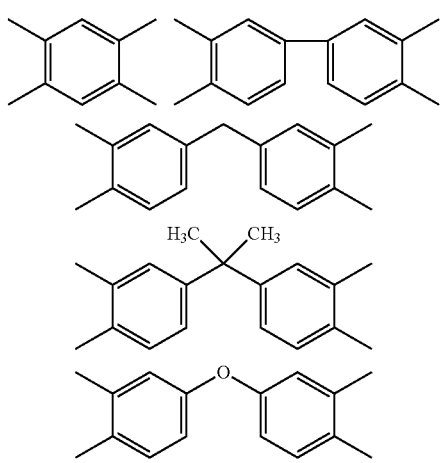

-continued

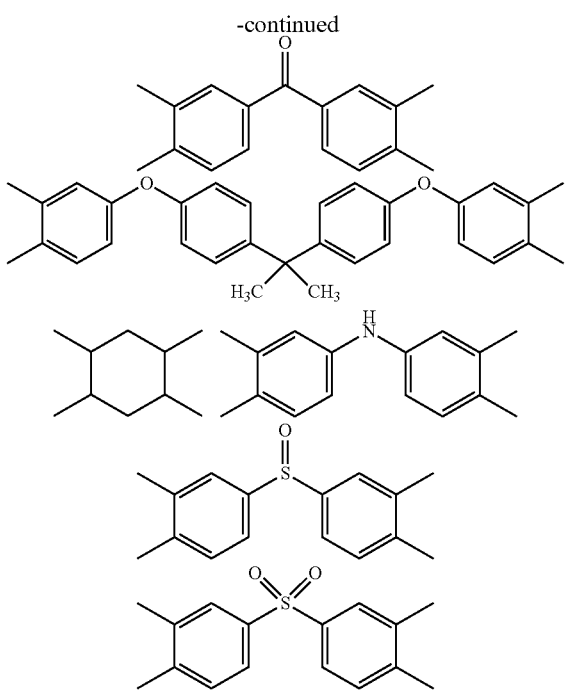

wherein bonds in the above structural formulae that are yet unbonded to substituent groups are to be bonded to carbonyl carbons forming cyclic imide structures in the formula (2).

13. The heat-curable resin composition according to claim 7, further comprising:
(C) a curing accelerator.

14. The heat-curable resin composition according to claim 13, further comprising:
(D) an inorganic filler.

15. The heat-curable resin composition according to claim 14, wherein the component (D) is surface-treated with a silane coupling agent having an amino group, a methacryl group, a vinyl group or a styryl group.

16. The heat-curable resin composition according to claim 14, further comprising:
(E) an adhesion aid having at least one epoxy group in one molecule.

17. A sealant for an electronic part, comprising the heat-curable resin composition according to claim 1.

18. A sealant for an electronic part, comprising the heat-curable resin composition according to claim 7.

19. The sealant according to claim 17, wherein the electronic part is a semiconductor device.

20. The sealant according to claim 18, wherein the electronic part is a semiconductor device.

21. The sealant according to claim 18, wherein the electronic part is a coil part.

22. A heat-curable adhesive agent comprising the heat-curable resin composition according to claim 1.

23. A heat-curable adhesive agent comprising the heat-curable resin composition according to claim 7.

24. An adhesive film formed as a layer on a support film, comprising the heat-curable resin composition according to claim 1.

25. An adhesive film formed as a layer on a support film, comprising the heat-curable resin composition according to claim 7.

26. A prepreg comprising a sheet-shaped fiber base material impregnated with the heat-curable resin composition according to claim 1.

27. A prepreg comprising a sheet-shaped fiber base material impregnated with the heat-curable resin composition according to claim 7.

28. A multi-layered printed-wiring board having an insulation layer formed by a cured product of the heat-curable resin composition according to claim 1.

29. A multi-layered printed-wiring board having an insulation layer formed by a cured product of the heat-curable resin composition according to claim 7.

* * * * *